United States Patent [19]

Carré et al.

[11] Patent Number: 4,560,209
[45] Date of Patent: Dec. 24, 1985

[54] BRAKING CORRECTOR RESPONSIVE TO DECELERATION

[75] Inventors: Jean-Jacques Carré, Le Raincy; Pierre Pressaco, La Courneuve, both of France

[73] Assignee: Societe Anonyme D.B.A., Paris, France

[21] Appl. No.: 519,951

[22] Filed: Aug. 3, 1983

[30] Foreign Application Priority Data

Aug. 9, 1982 [FR] France ................. 82 13850

[51] Int. Cl.$^4$ .................. B60T 8/26; B60T 8/14; G05D 16/02; G05D 16/04
[52] U.S. Cl. .................. 303/22 R; 188/195; 303/24 A; 303/24 C
[58] Field of Search .......... 303/24 A, 24 F, 24 C, 303/24 R, 22 A, 11; 188/349, 195

[56] References Cited

U.S. PATENT DOCUMENTS

| 3,087,761 | 4/1963 | Stelzer | 303/24 F |
| 3,143,379 | 8/1964 | Eksergian | 303/24 F |
| 3,147,045 | 9/1964 | Stelzer | 303/24 F |
| 3,317,251 | 5/1967 | Hambling et al. | 303/24 A |
| 3,664,713 | 5/1972 | Riordan et al. | 303/96 X |

FOREIGN PATENT DOCUMENTS

| 470944 | 2/1929 | Fed. Rep. of Germany . |
| 3021229 | 12/1980 | Fed. Rep. of Germany . |
| 3041879 | 6/1982 | Fed. Rep. of Germany . |
| 0087642 | 7/1980 | Japan ................. 303/24 C |

Primary Examiner—Douglas C. Butler
Attorney, Agent, or Firm—Larry J. Palguta; Ken C. Decker

[57] ABSTRACT

The braking corrector according to the invention consists of two corrector valve seats (332, 332') and two inertia weights (328, 328') mounted in parallel in the same casing (312), and two magnets (336, 336') mounted on the same iron plate (340), the magnetic poles of the magnets being reversed so that the magnetic field (M) set up by the magnets (336, 336') is looped through the plate (340) on the one hand, and through the inertia weights (328, 328') on the other.

4 Claims, 8 Drawing Figures

BRAKING CORRECTOR RESPONSIVE TO DECELERATION

The invention concerns braking correctors responsive to deceleration.

Numerous devices of this type are known in which a corrector valve is coupled to an inertia weight which is sensitive to deceleration and is capable of being displaced against return means when a predetemined deceleration is exceeded to cause the closure of said valve.

Two main classes of such return means are known, the first consisting of mounting the inertia weight on a ramp inclined relative to the horizontal, and the second consisting of providing a spring which acts on the inertia weight.

In the first case, it is observed that the returning force due to the displacement of the weight along a ramp disappears when the vehicle is subject to vertical shocks or vibrations. In fact, such phenomena, which occur when driving over uneven ground, cause the weight to lose contact with the ramp and even a slight deceleration causes the displacement of the weight and the closure of the valve.

In the second case, the presence of the spring introduces undesirable rubbing during the displacement of the weight, generally constructed in the form of a ball, especially when the low value of the inertia forces acting on the latter are considered. It is then observed that the device lacks reliability, and also that its construction is relatively complex, principally when an adjustment must be provided for the calibration of the spring.

To overcome these disadvantages, the present invention proposes to achieve such a return means by means of a magnet positioned at the rear, with regard to the direction of motion of the vehicle, of said inertia weight, the latter being made of a magnetic material and the surrounding components of non-magnetic materials.

The features and advantages of the invention will emerge more clearly from perusal of the following description, with reference to the accompanying drawings, in which.

Figure 1:
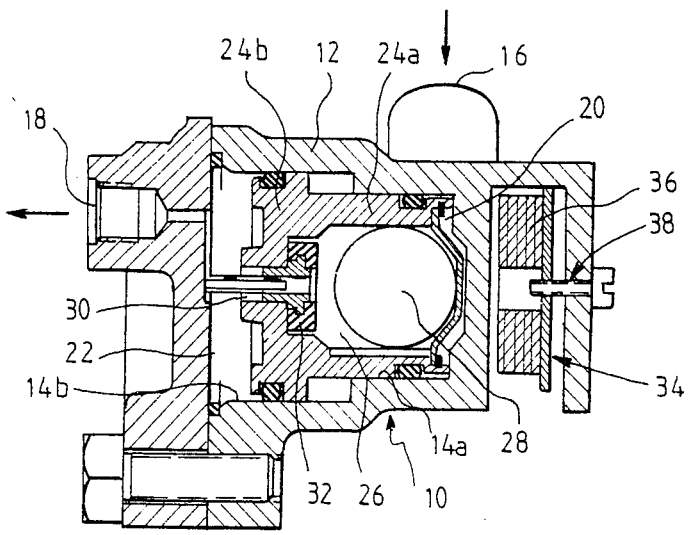
FIG. 1 is a longitudinal section of a single circuit corrector according to the invention.

The corrector 10 shown in FIG. 1 consists of a casing 12 in which a stepped cavity 14a–14b is defined. Two ports for the inlet 16 and the outlet 18 open into the two ends of the cavity 14 in two chambers for the inlet 20 and the outlet 22, respectively.

A stepped piston 24a–24b is mounted so as to slide in the cavity 14 between the inlet chamber 20 and the outlet chamber 22. A cylindrical housing 26 inside the piston 24 communicates with the inlet chamber 20 and houses a spherical inertia weight, or ball, 28. A passage 30 joins the housing 26 to the outlet chamber 22. A valve seat 32 is mounted at the mouth of this passage towards the housing 26, the ball 28 itself constituting a valve poppet capable of cooperating with the seat 32.

Lastly, the corrector 10 incorporates return means 34 exerting on the ball 28 a return force directed away from the seat 32. According to the invention the return means 34 consists of a magnet 36 fixed to the casing 12 at the rear of the ball 28, with regard to the direction of motion of the vehicle. The ball 28 is made of magnetic material and the casing 12 and the piston 24 are made of non-magnetic material.

If a pre-adjustment of the position of the magnet 36 is desired, an adjustable mounting 38 for the magnet 36 may be provided on the casing.

Besides the advantages already mentioned, it will be observed that, away from the rest position as illustrated in FIG. 1, the force exerted by the magnet 36 on the ball 28 decreases rapidly, in such a way that as soon as the deceleration of the vehicle reaches a predetermined value, the ball leaves its rest position and necessarily comes to be applied to the seat 32, the vibrations with horizontal and vertical components no longer being able to influence the movement of the ball away from its rest position.

Figure 2:
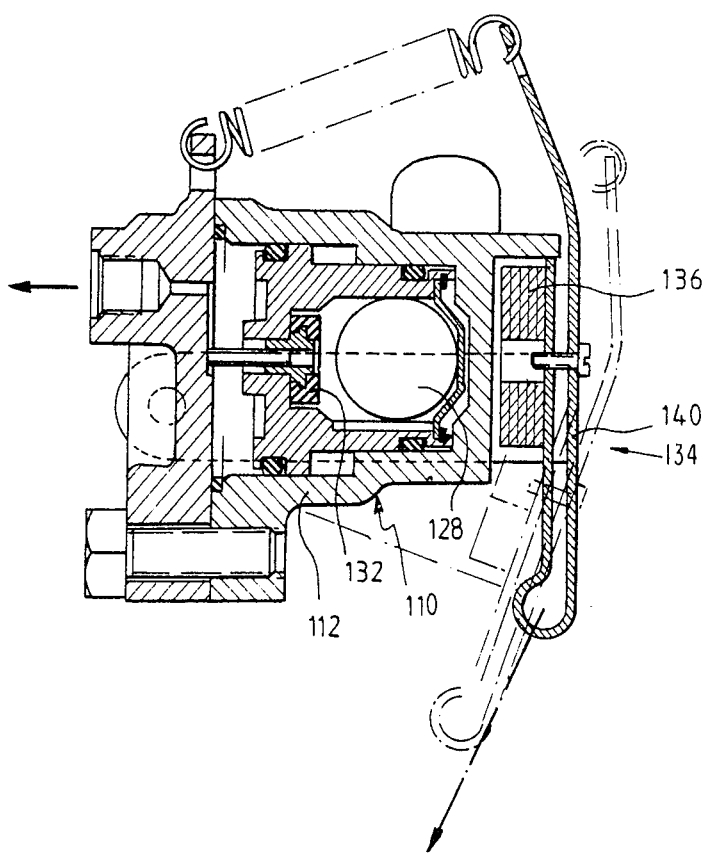
FIGS. 2 and 3 are variants of the embodiment shown in FIG. 1.

In the variant illustrated in FIG. 2, in which identical components carry the same reference numbers, increased by the value 100, the magnet 136 is mounted on an arm 140 which oscillates relative to the casing 12 and the arm 140 is linked to the suspension device of the vehicle (not shown).

In this way, the restoring force exerted by the magnet 136 on the ball 128 will be variable as a function of the load on the vehicle, as will also the deceleration, which, when exceeded, will cause the ball to leave its rest position and come to be applied to the seat 132.

Figure 3:
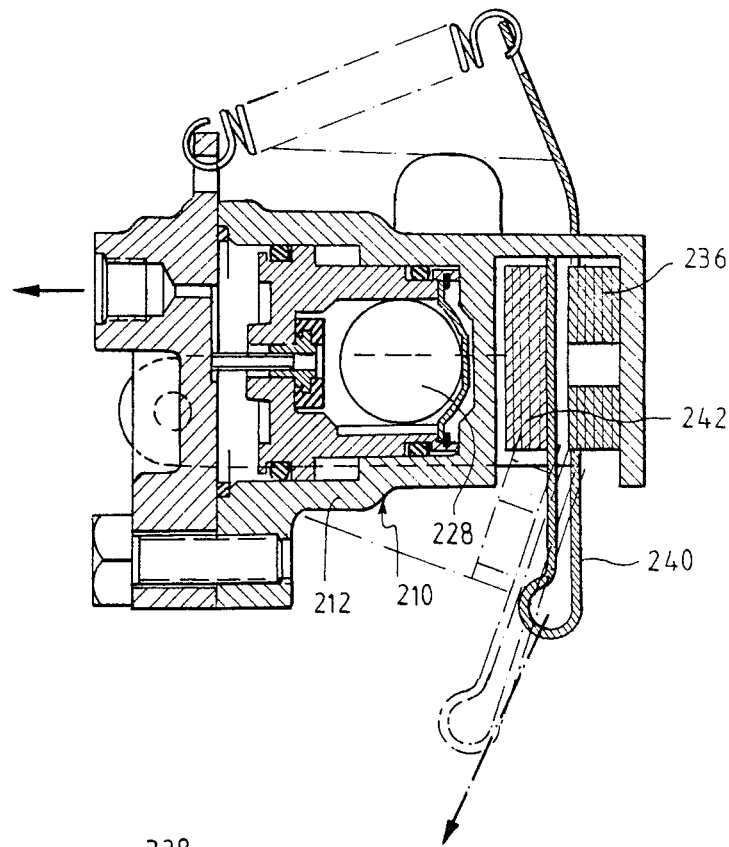

In the variant illustrated in FIG. 3, in which identical components carry the same reference numbers increased by the value 200, the magnet 236 is fixed to the casing 212, and the arm 240, oscillating relative to the casing as a function of the load on the vehicle, carries a component 242 made of a material possessing a finite magnetic resistance. In this way, according to the position of the component 242 relative to the ball 228 and to the magnet 236, the force exerted by the latter on the former will be variable as a function of the load on the vehicle.

Figure 7:
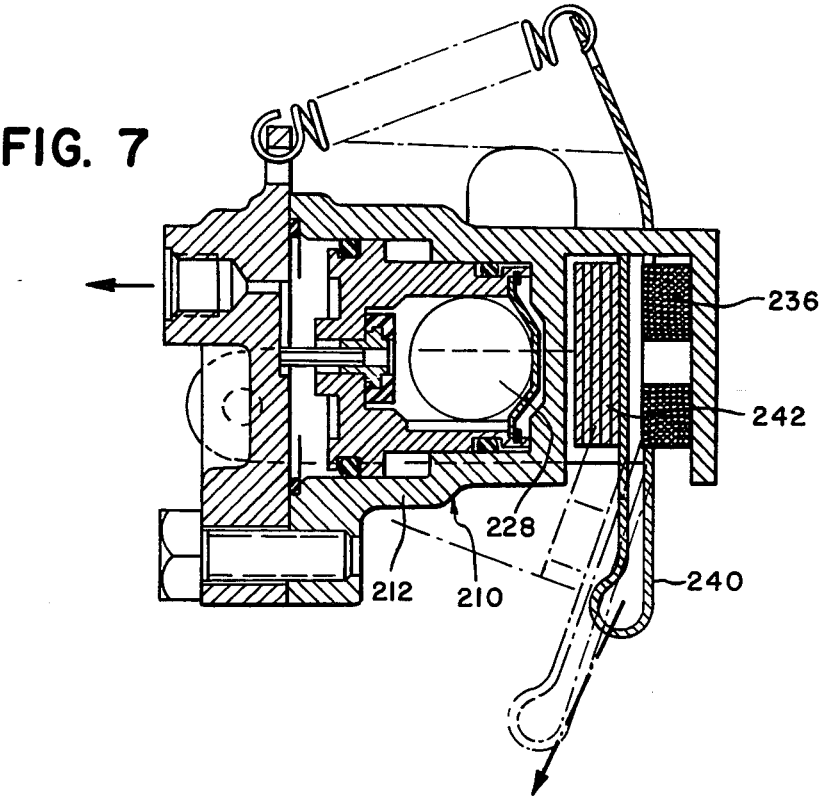
FIG. 7 is a variant of the embodiment shown in FIG. 3.
Figure 8:
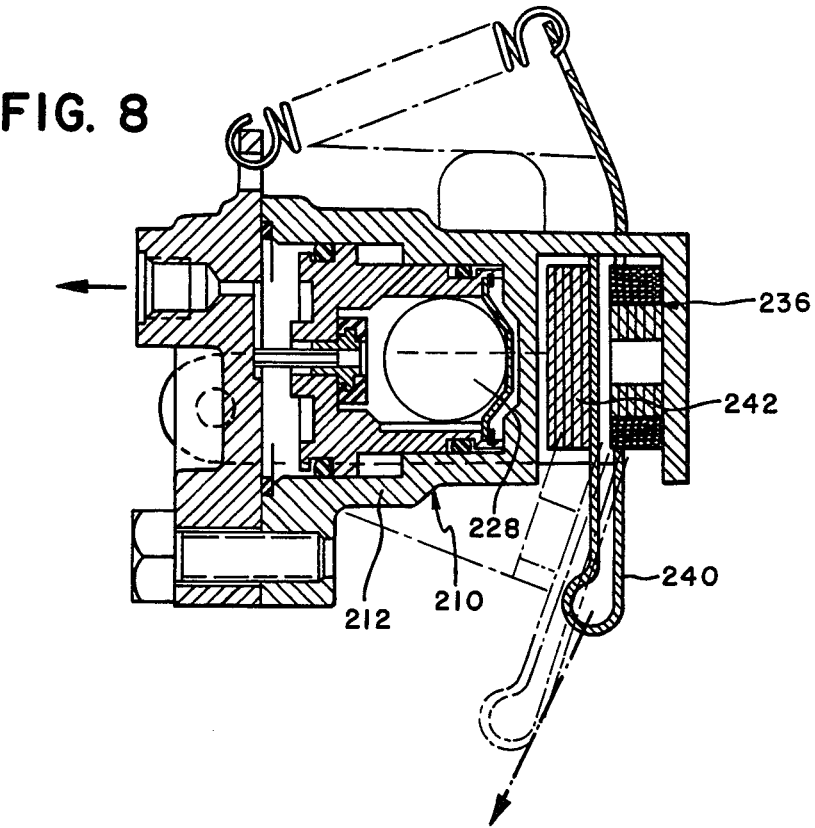
FIG. 8 is another variant of the embodiment shown in FIG. 3.

For the three embodiments described above, the magnet 36, 136, 236 could also be constructed in the form of an electromagnet (see FIG. 7) controlled as a function of various parameters of the operation of the vehicle and/or of its braking system, or again as a combination of permanent magnet plus electromagnet (see FIG. 8).

Figure 5:
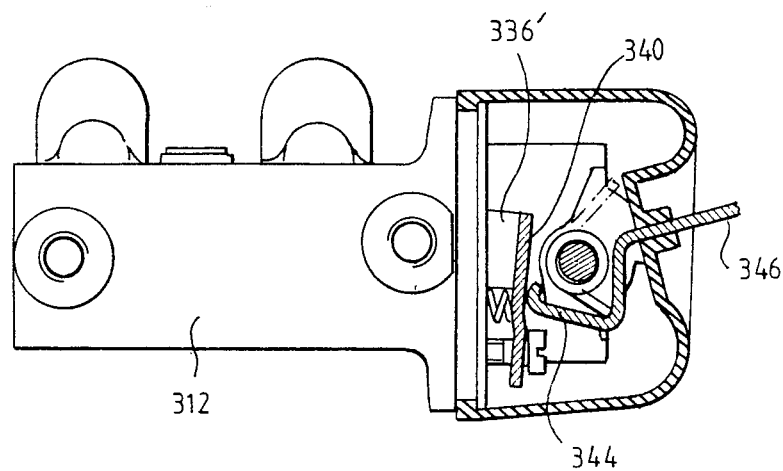
FIG. 5 is a partially sectioned view of the corrector shown in FIG. 4, along the line V—V.
Figure 4:
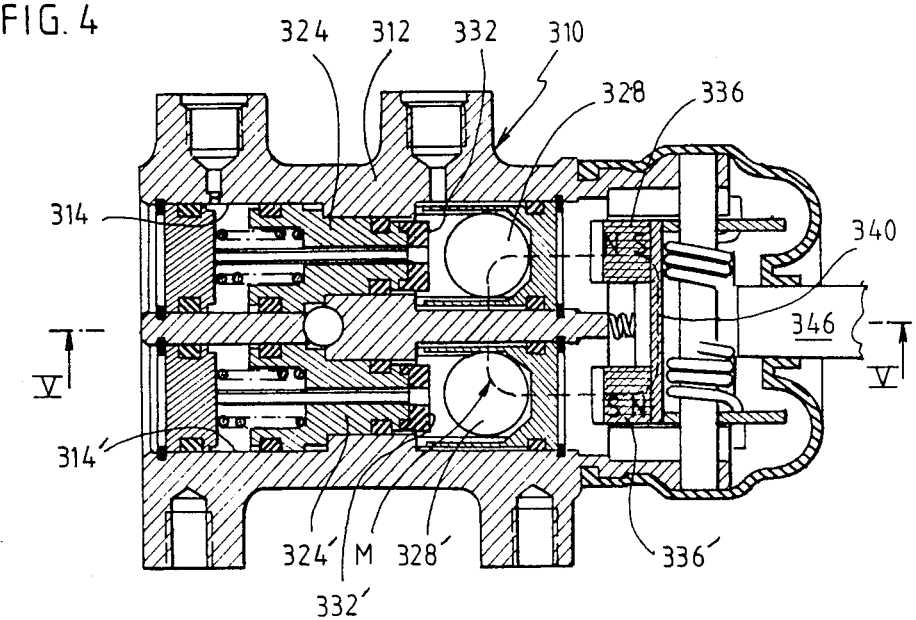
FIG. 4 is a longitudinal section of a twin circuit corrector according to the invention.

In the embodiment shown in FIGS. 4 and 5, the casing 312 incorporates two cavities 314 and 314' positioned in parallel and having two identical pistons 324 and 324' and two balls 328 and 328'.

The two magnets 336 and 336' are mounted on a common plate 340 which pivots relative to the casing 312 under the action of a device with a cam 344 and a lever 346 as a function of the load on the vehicle. In particular, it will be noted that the magnetic poles of the two magnets are reversed, as shown.

In this way, a looped magnetic field is set up, whose lines of force (see dotted line M in FIG. 4) form a coupling between the two balls 336 and 336'. The plate 340 is made of iron or of materials similar in this respect, which enables the lines of force to be looped opposite the magnets 336 and 336'.

The essential result of such a construction lies in the fact that this coupling causes a reciprocal dependence on the position of the two balls 336 and 336′. In other words, if one of the balls leaves its rest position before the other, the latter will tend to hold back its more rapid neighbor, whereas the first will tend to draw along the "slower" ball and the two balls will therefore move in unison.

Small differences in the adjustment of the initial position of the two magnets will thus be of no importance and the two correctors will operate as an identical predetermined deceleration.

Figure 6:
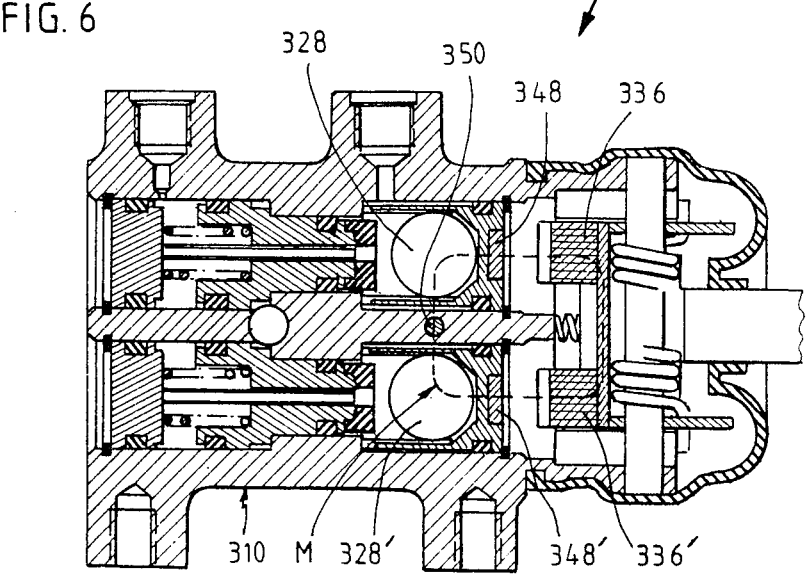
FIG. 6 is a variant of the embodiment shown in FIG. 4.

According to the variant illustrated in FIG. 6, the magnetic coupling has been improved by introducing inserts 348, 348′, 350 made from an iron base, or from materials similar in this respect, which enable the "looped" magnetic lines of force M to be better concentrated.

In the case of these variants, of correctors for twin circuits, the operation could also be made dependent on the load on the vehicle not by displacement of the magnets 336 and 336′, but by displacement of a component forming a screen (not shown) of finite magnetic resistance (cf. FIG. 3).

The magnets 336, 336′ could also be constructed as electromagnets or as combinations of permanent magnets plus electromagnets, as already outlined above. Finally it is possible to arrange for the inertia weight a slope or ramp to provide the shutting-off operation when empty, the magnet or magnets intervening to provide the shutting-off when loaded.

We claim:

1. A braking corrector responsive to the deceleration of a vehicle, comprising a casing having a corrector valve therein, an inertia weight mounted for movement inside said casing away from return means in response to a predetermined deceleration of said vehicle to control said valve, characterized in that said return means comprises at least one magnet positioned at the rear, with regard to the normal direction of motion of the vehicle, of said inertia weight, the inertia weight being made of magnetic material and said casing of non-magnetic material, said magnet fixed to said casing and the braking corrector incorporating a component made of material possessing finite magnetic resistance and interposed between said magnet and said inertia weight, the component mounted so as to move relative to said casing as a function of the load on the vehicle.

2. The braking corrector according to claim 1, characterized in that said magnet is a permanent magnet.

3. The braking corrector according to claim 1, characterized in that said magnet is an electromagnet.

4. The braking corrector according to claim 1, characterized in that said magnet is the combination of a permanent magnet and an electromagnet.

* * * * *